(12) United States Patent
Polk, Jr.

(10) Patent No.: US 11,305,468 B2
(45) Date of Patent: Apr. 19, 2022

(54) THERMOPLASTIC MOLDING PROCESS AND APPARATUS

(71) Applicant: D & D Manufacturing, LLC, Rockledge, FL (US)

(72) Inventor: Dale E. Polk, Jr., Titusville, FL (US)

(73) Assignee: D&D Manufacturing, LLC, Rockledge, FL (US)

(*) Notice: Subject to any disclaimer, the term of this patent is extended or adjusted under 35 U.S.C. 154(b) by 292 days.

(21) Appl. No.: 16/597,996

(22) Filed: Oct. 10, 2019

(65) Prior Publication Data
US 2020/0114550 A1    Apr. 16, 2020

Related U.S. Application Data

(60) Provisional application No. 62/746,431, filed on Oct. 16, 2018.

(51) Int. Cl.
*B29C 43/34* (2006.01)
*B29C 43/18* (2006.01)
*B29K 101/12* (2006.01)

(52) U.S. Cl.
CPC .............. *B29C 43/34* (2013.01); *B29C 43/18* (2013.01); *B29C 2043/3433* (2013.01); *B29K 2101/12* (2013.01)

(58) Field of Classification Search
None
See application file for complete search history.

*Primary Examiner* — Robert J Grun
(74) *Attorney, Agent, or Firm* — M. A. Ervin & Associates; Michael A. Ervin

(57) ABSTRACT

A thermoplastic molding process for large parts and particularly to novel rotating elbow piping configurations used to precisely deposit prescribed amounts of thermoplastics or thermoplastic composites into large compression molds.

14 Claims, 6 Drawing Sheets

THERMOPLASTIC MOLDING PROCESS AND APPARATUS

CROSS-REFERENCE TO RELATED APPLICATIONS

This application claims the benefit of U.S. Provisional application 62/746,431 filed Oct. 16, 2018. The aforementioned patent application is hereby incorporated by reference in its entirety into the present application to the extent consistent with the present application.

FIELD

This disclosure relates to a thermoplastic molding system and process for large parts and particularly to novel rotating elbow piping configurations used to precisely deposit prescribed amounts of molten composite materials into large compression molds.

BACKGROUND

Many, though not all of these thermoplastic formulations, are materials formed from a mixture of two or more components that produce a material with properties or characteristics that are superior to those of the individual materials. Most composites comprise two parts, namely a matrix component and reinforcement component(s). Matrix components are the materials that bind the composite together and they are usually less stiff than the reinforcement components. These materials are shaped under pressure at elevated temperatures. The matrix encapsulates the reinforcements in place and distributes the load among the reinforcements. Since reinforcements are usually stiffer than the matrix material, they are the primary load-carrying component within the composite. Reinforcements may come in many different forms ranging from fibers, to fabrics, to particles or rods imbedded into the matrix that form the composite.

Of the many methods of molding the requirements for producing large thermoplastic parts are best realized using large scale and relatively low pressure compression molding.

An important molding technique useful for this technique was developed and described in U.S. Pat. No. 7,208,219 (Dale Polk Sr. & Dale Polk Jr.) which made use of a then novel dynamic gated dies to deliver discrete controlled materials (blended thermoplastics and fiber matrices) gravitated onto a lower portion of a mold. The lower portion of the mold was moved in space and time while receiving the flow of composite material to deposit a predetermined quantity of molten composite material thereon conforming to mold cavities of the lower and an upper portion of the mold. The upper portion of the mold may be pressed against the predetermined quantity of molten composite material and closing on the lower portion of the mold to form the article. This dynamic gated die approach is still in use today.

FIGS. 6A and 6B in U.S. Pat. No. 7,208,219 illustrate implementation of a dynamic gated die in a one press (6A) and two press (6B) system. A movable trolley carrying the lower mold is moved under the dynamic die in a programmed manner to receive the molding material.

The use of the dynamic gated die to feed thermoplastic materials in a precise manner exactly where needed onto a lower mold, while still useful, has a number of functional deficiencies. The die itself is a complex mechanical system. The passage of the thermoplastic materials through the multiple gates can lead to loss of fiber length through the system, especially when trying to achieve longer fiber lengths. There is also a high pressure drop through the die system. The ongoing maintenance of the gate systems required can also lead to frequent maintenance work. And finally, the dynamic gated die systems can be difficult to clean out after a run, especially with high fiber loaded materials.

BRIEF SUMMARY

Figure 1:
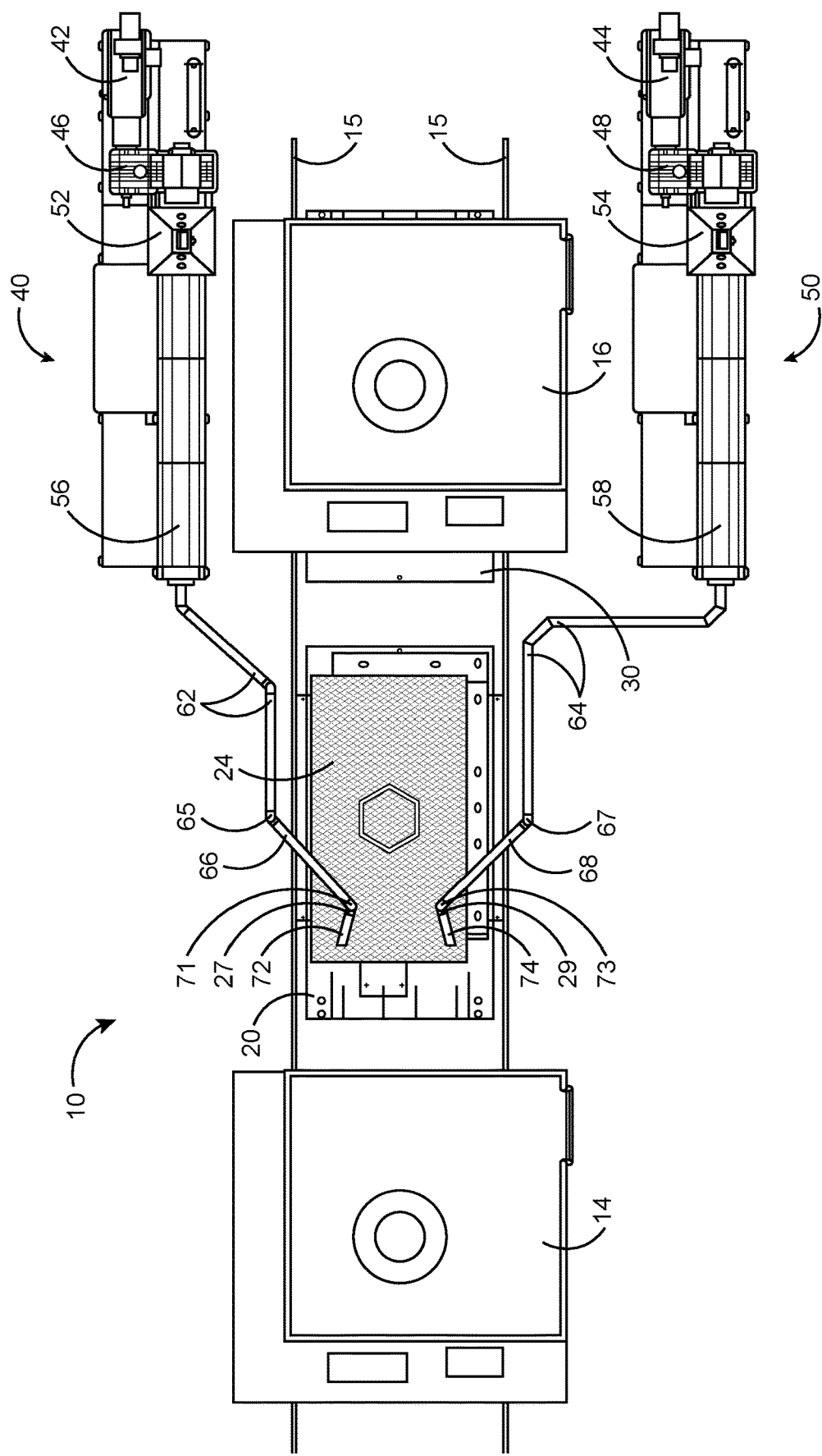
FIG. 1 illustrates the initial deposit of thermoplastic materials in a first lower mold in the rotating elbow swivel feed system.

In an embodiment there is a molding system for forming articles from thermoplastic materials and reinforcement materials, said molding system including at least: two extruders operable to blend and melt the thermoplastic material with the reinforcement material to form a flow of molten composite material for gravitating onto lower portions of molds; a first movable structure carrying a a lower portion of a first mold and operable to be moved in space and time while that lower portion of the first mold receives a flow of molten composite materials to deposit a predetermined quantity of molten composite materials thereon conforming to mold cavities of the lower and an upper portion of the first mold; a second movable structure carrying a lower portion of a second mold and operable to be moved in space and time while that lower portion of the second mold receives a flow of molten composite materials to deposit a predetermined quantity of molten composite materials thereon conforming to mold cavities of the lower and an upper portion of the second mold; a first press coupled to an upper portion of the first mold and capable of receiving the first movable structure with the lower portion of the first mold, said first press operable to press the upper portion of the first mold against the predetermined quantity of molten composite materials on the lower portion of the first mold to form the articles; a second press carrying an upper portion of the second mold and capable of receiving the second movable structure with the lower portion of the second mold, said second press operable to press the upper portion of the second mold against the predetermined quantity of molten composite materials on the lower portion of the second mold to form the articles; primary rigid piping running from each extruder and coupled to first rotating elbows under software control that are operable to move secondary rigid piping across the lower molds as the movable structures carrying the lower molds move in time and space; and second rotating elbows between the secondary rigid piping and feed nozzles under software control that gravitationally deliver precise amounts of molten composite materials directly into the lower molds.

In another embodiment there is a molding process for forming articles from thermoplastic materials and reinforcement materials, including at least: heating and blending thermoplastic materials with reinforcement materials to form a molten thermoplastic composite material having a concentration of reinforcement material by weight; extruding the molten composite material to form a flow of composite material gravitating onto a lower portion of a first mold for forming the article, wherein the lower portion of the first mold is carried by a first movable structure; moving the first movable structure and lower portion of the first mold in space and time toward a first press coupled to an upper portion of the first mold and capable of receiving the first movable structure with the lower portion of the first mold while receiving the flow of composite material to deposit a predetermined quantity of molten composite material thereon conforming to mold cavities of the lower and an upper portion of the first mold; moving the first movable structure and lower portion of the first mold with its predetermined quantity of molten composite material under the first press to press the upper portion of the first mold against the predetermined quantity of molten composite materials on the lower portion of the first mold to form an article; extruding the molten composite material to form a flow of composite material gravitating onto a lower portion of a second mold for forming an article, wherein the lower portion of the second mold is carried by a second movable structure; moving the second movable structure and lower portion of the second mold in space and time toward a second press coupled to an upper portion of the second mold and capable of receiving the second movable structure with the lower portion of the second mold while receiving the flow of composite material to deposit a predetermined quantity of molten composite material thereon conforming to mold cavities of the lower and an upper portion of the second mold; moving the second movable structure and lower portion of the second mold with its predetermined quantity of molten composite material under the second press to press the upper portion of the second mold against the predetermined quantity of molten composite materials on the lower portion of the second mold to form an article; wherein the steps of extruding the molten composite materials to form a flow of composite material gravitating onto a lower portion of a first and second mold comprise feeding the molten composite material from two extruders through primary rigid piping running from each extruder and coupled to first rotating elbows under software control that are operable to move secondary rigid piping across the lower molds as the movable structures carrying the lower molds move in time and space; and wherein the secondary moving piping is connected to second rotating elbows under software control that are operable to move final nozzles that distribute the predetermined quantities of molten composite materials onto the lower molds.

DETAILED DESCRIPTION

The proposed simplification of a material laydown system involves completely replacing the dynamic gated die with a new approach in which net shape material laydowns onto a lower mold can be made with a new and simplified technology in which use is made of feeder system of two rotating pipe elbows coming from two extruder systems that are under software control based on the exact shape of the part to be made. The ends of the rotating pipe elbows have a final nozzle that precisely deposits the required amount of composite material in the required locations.

In one embodiment of the proposed invention FIG. 1 is a two press and two moveable structure implementation 10. At this stage of the material depositing process there is one moveable structure 20 shown carrying a lower mold 24 and riding on rails 15 between two presses 14, 16. The need for a gated dynamic die, as described in the prior art is completely eliminated. A second moveable structure 30 with its own lower mold 26 is parked under press 16. That lower mold is only barely visible in FIG. 1 as it is under press 16. It will be shown in later figures. There are two matching extruder systems 40,50 having electric motors 42,44; gearboxes 46,48; feed hoppers 52,54 for the materials (thermoplastic and reinforcement materials) and there are extruder barrels 56,58 for blending, heating, and feeding the molten composite materials to lower molds.

Running from the end of the extruder barrels are piping arrangements carrying the molten extruder output. The initial piping 62 from the upper extruder and piping 64 from the lower extruder are rigid. Between rigid piping 62 and piping 66 is a rotating elbow 65 that is under software control to precisely move rigid pipe 66 in a programmed manner around the mold as the mold traverses toward press 14. A second rotating elbow 71 between rigid pipe 66 and a nozzle 27 that accurately gravitationally delivers precise amounts of thermoplastic into parts of the lower mold 24. Numeral 72 represents the initial laydown of thermoplastic materials coming from nozzle 27 and gravitationally deposited onto the lower mold 24 as it is moved from the right to the left toward press 14. The software control is based on driving rotating nozzles 65 and 27 based on the known thermoplastic composite material requirements of lower mold 24 in different locations of lower mold 24.

Moving now to the piping arrangement from extruder 50, the piping arrangement works in the same manner. Between rigid piping 64 and piping 68 is a rotating elbow 67 that is under software control to precisely move pipe 68 in a programmed manner around the mold as the mold traverses toward press 14. A second rotating elbow 73 between pipe 68 and a nozzle 29 accurately gravitationally delivers precise amounts of thermoplastic into parts of the lower mold 24. Numeral 74 thus represents the initial laydown of thermoplastic materials coming from nozzle 29 and gravitationally deposited onto the lower mold 24 as it is moved from the right to the left toward press 14. The software control is based on driving rotating nozzles 67 and 29 based on the known thermoplastic material requirements of lower mold 24 in different locations of lower mold 24.

Figure 2:
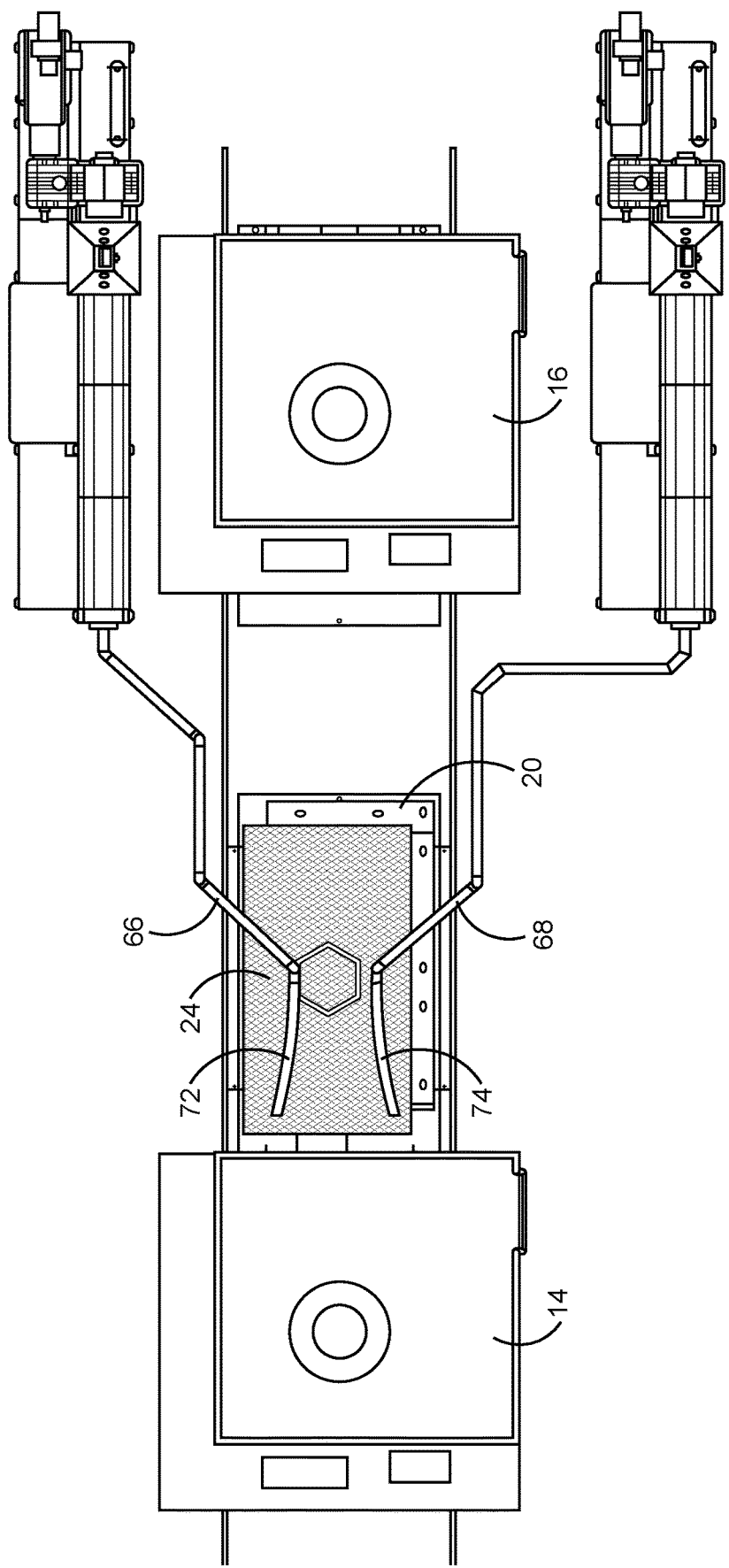
FIG. 2 illustrates a later stage deposit of thermoplastic materials in a first lower mold in the rotating elbow swivel feed system.
Figure 3:
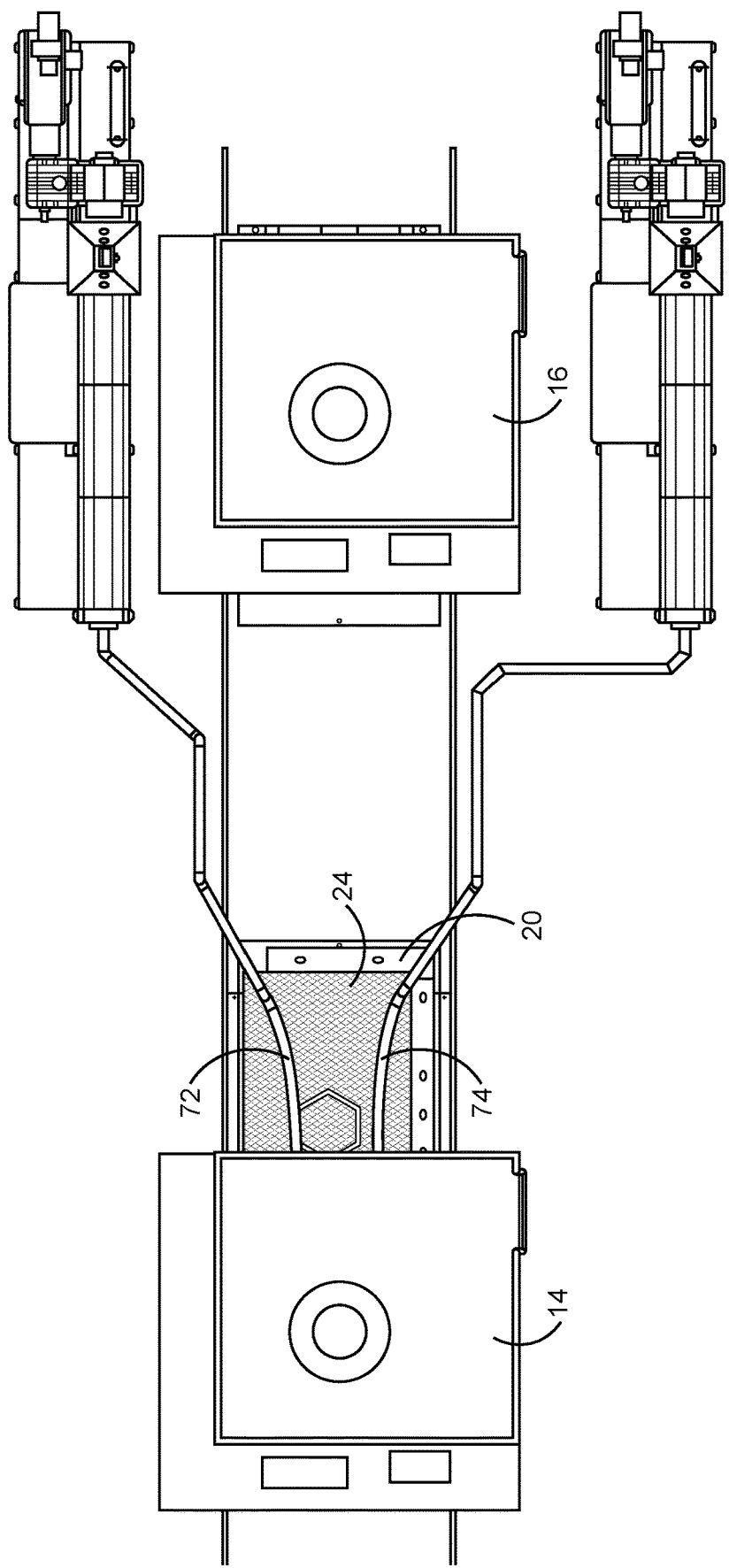
FIG. 3 illustrates the end stage deposit of thermoplastic materials in a first lower mold in the rotating elbow swivel feed system.

FIG. 2 shows a continued stage of the process as the movable structure 20 initially enters under the press 14 and leaves behind extended logs 72 and 74 of thermoplastics. And in FIG. 3 the first movable structure 20 is further into press 14 and extended logs 72 and 74 of thermoplastic material is left on the lower mold. It can be seen that this process allows for precise deposit of thermoplastic material.

Once the first movable structure 20 has deposited thermoplastic material to the end of mold 24 that movable structure enters completely into the press 14 to undergo compression molding as the upper mold (already in press 14), is pressed down onto the lower mold and movable structure 30 traverses out from under press 16 and is lined up to begin accepting feed of thermoplastic material.

Figure 4:
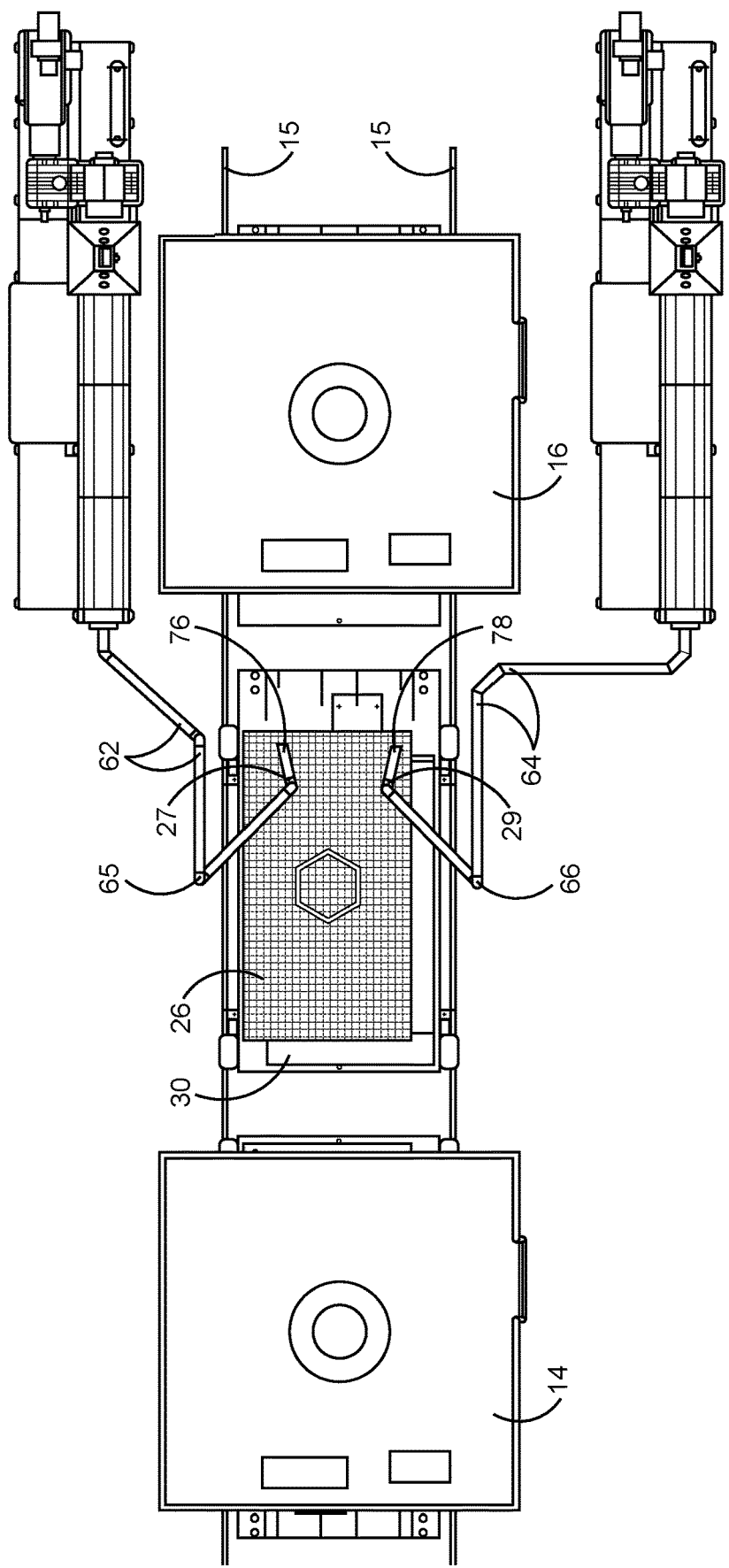
FIG. 4 illustrates the initial deposit of thermoplastic materials in a second lower mold in the rotating elbow swivel feed system.

Turning now to FIG. 4, movable structure 30 carrying lower mold 26 is now in place to receive thermoplastic material. For this step of the process the thermoplastic material will be fed beginning on the right side of lower mold 26 because movable structure 30 will be driven to move toward press 16 while lower mold 24 is under press 14 undergoing compression molding. In order to feed material for this step the two rigid piping's 62 and 64 remain in place and rotating elbows 65 and 67 rotate the remainder of the feed piping to enable the feed nozzles 27 and 29 to begin feeding on the right side of lower mold 26 as movable structure 30 carries lower mold 26 toward press 16. The initial material laydown of thermoplastic material is shown as numerals 76 and 78.

Figure 5:
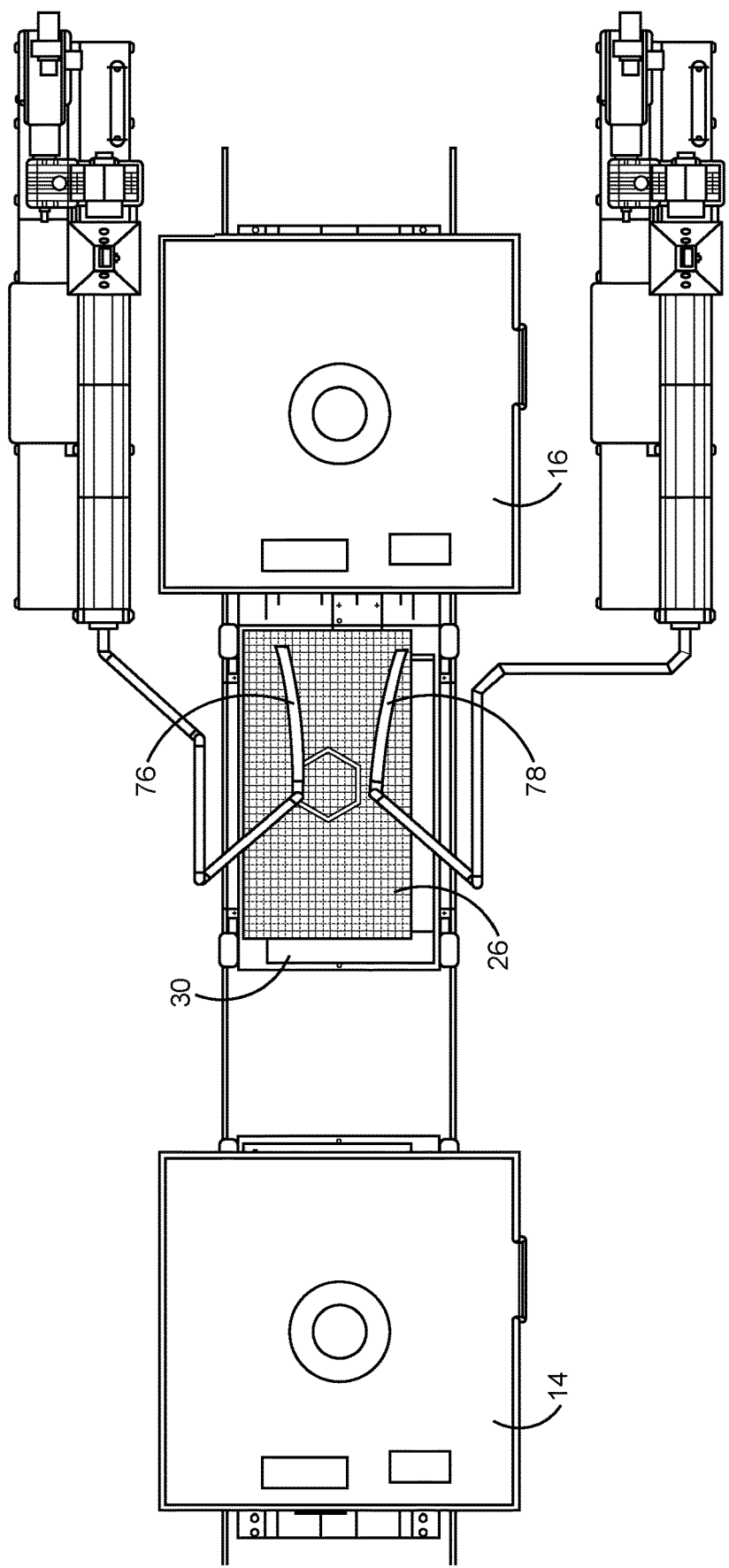
FIG. 5 illustrates a later stage deposit of thermoplastic materials in a second lower mold in the rotating elbow swivel feed system.

FIG. 5 illustrates a further progression of the process as movable structure 30 carrying lower mold 26 is much closer to press 16 and as a result larger "logs" of thermoplastic material 76 and 78 are deposited on lower mold 26.

Figure 6:
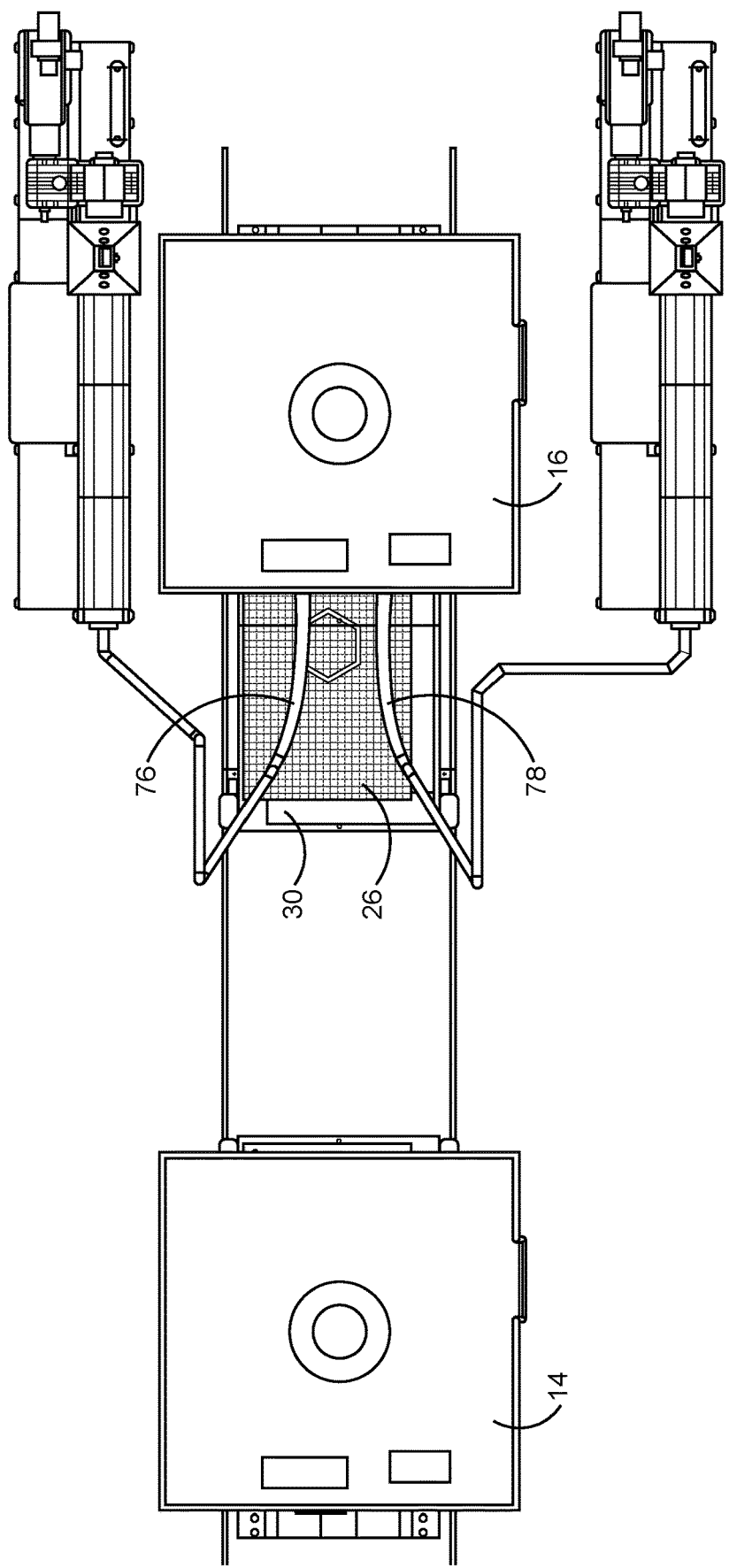
FIG. 6 illustrates the end stage deposit of thermoplastic materials in a second lower mold in the rotating elbow swivel feed system.

FIG. 6 illustrates a point in time almost at the end of the feed cycle for lower mold 26. Movable structure 30 is about half way under press 16 and the thermoplastic composite material laydown 76, 78 is almost complete. As it completes movable structure 30 will be moved completely under press 30 where it will be pressed under an upper mold (already in place) to complete another molded part.

The movable structures can be implemented in a number of ways. As illustrated in the FIGS. 1-6 the movable structures 20,30 can be software-controlled motorized trolleys riding on rails 15 between first press. It should be understood that other movement mechanisms may be utilized to control movement for the movable structures. For example, a conveyer, suspension, or track drive system may be utilized to control movement for the movable structures that carry the lower molds 24,26. The movement of the movable structure may be controlled along the axis of movement to deposit the extruded composite material in various amounts along the axis of deposit.

By providing for separate control of the travel rate of the movable structures 20,30, as well as control of the flow rate of the extruded composite material, and the position of the nozzles 27,29 moving across the lower molds 24,26 the extruded composite layer can be dynamically altered in terms of thickness as a function of position on the lower mold to achieve the desired predetermined laydown of material to mold the cavities of the lower and upper portion of each mold.

With respect to the use of fibers as reinforcement materials any type of fibrous material can be used in this approach. For example, the fibrous material can be glass fibers, fiberglass, carbon fibers, synthetic fibers, metal fibers, natural fibers, cellulose, or wood.

Any kind of thermoplastic resin can be used to prepare articles in accordance with the present invention. Examples of suitable thermoplastic resins are polyolefins, polyhaloolefins, polyaromatics, poly(alkenylaromatics), polystyrene, acrylonitrile/butadiene/styrene resins, polyamides, nylon, poly(carboxylic acids), polyamines, polyethers, polyacetals, polysulfones, poly(organicsulfides), poly(organicoxides), polyesters, polycarbonates, polyimides, polyurethanes, polyetheretherketone resins, styrene/maleic anhydride resins, and mixtures thereof.

The thermoplastic resin can be a single polymer, or a mixture of two or more polymers. In particular embodiments, the thermoplastic resin can comprise a homopolymer, copolymer, random copolymer, alternating copolymer, block copolymer, graft copolymer, liquid crystal polymer, or a mixture of these polymers.

The thermoplastic resin can be a virgin resin, a recycled resin, or a mixture of a virgin resin and a recycled resin in any proportion. The thermoplastic resin may optionally comprise a coupling agent which enhances bonding of the fibrous material to the resin.

The resulting system completely eliminates the aforementioned functional deficiencies of the gated dynamic die, namely, it is much less complex, does not create loss of fiber length, has minimal pressure drop, eliminates a constant maintenance of the intricate gate mechanisms, and is very simple to clean after a run.

It should be noted that the inventive concept described herein could also be done with only one extruder because the inventive concept of rotating elbows contains great flexibility in that all parts of the mold are accessible. This would save the capital cost of a two extruder system and the operating expenses of two extruders. The tradeoff would be in productivity as the time required to apply the full material requirement across the lower mold would increase.

It also should be noted that this approach has great advantages also even for straight thermoplastic material systems (no composites).

The present invention has been described with reference to specific details of particular embodiments. It is not intended that such detailed be regarded as limitations upon the scope of the invention except insofar as and to the extent that they are included in the accompanying claims.

I claim:

1. A molding system for forming articles from thermoplastic materials and reinforcement materials, said molding system comprising:
   a. two extruders operable to blend and melt the thermoplastic material with the reinforcement material to form a flow of molten composite material for gravitating onto lower portions of molds;
   b. a first movable structure carrying a lower portion of a first mold and operable to be moved in space and time while that lower portion of the first mold receives a flow of molten composite materials to deposit a predetermined quantity of molten composite materials thereon conforming to mold cavities of the lower and an upper portion of the first mold;
   c. a second movable structure carrying a lower portion of a second mold and operable to be moved in space and time while that lower portion of the second mold receives a flow of molten composite materials to deposit a predetermined quantity of molten composite materials thereon conforming to mold cavities of the lower and an upper portion of the second mold;
   d. a first press coupled to an upper portion of the first mold and capable of receiving the first movable structure with the lower portion of the first mold, said first press operable to press the upper portion of the first mold against the predetermined quantity of molten composite materials on the lower portion of the first mold to form the articles;
   e. a second press coupled to an upper portion of the second mold and capable of receiving the second movable structure with the lower portion of the second mold, said second press operable to press the upper portion of the second mold against the predetermined quantity of molten composite materials on the lower portion of the second mold to form the articles;
   f. primary rigid piping running from each extruder and coupled to first rotating elbows under software control that are operable to move secondary rigid piping across the lower molds as the movable structures carrying the lower molds move in time and space; and g. second rotating elbows between the secondary rigid piping and feed nozzles under software control that gravitationally deliver precise amounts of molten composite materials directly into the lower molds.

2. The molding system for forming articles from thermoplastic materials and reinforcement materials of claim 1 wherein the first and second movable structures are software-controlled motorized trolleys with wheels riding on rails along an axis between the first and second presses.

3. The molding system for forming articles from thermoplastic materials and reinforcement materials of claim 1 wherein the reinforcement materials are fibrous materials.

4. The molding system for forming articles from thermoplastic materials and reinforcement materials of claim 3 wherein the fibrous materials can be glass fibers, fiberglass, carbon fibers, synthetic fibers, metal fibers, natural fibers, cellulose, or wood.

5. The molding system for forming articles from thermoplastic materials and reinforcement materials of claim 1 wherein the thermoplastic materials can be polyolefins, polyhaloolefins, polyaromatics, poly(alkenylaromatics), polystyrene, acrylonitrile/butadiene/styrene resins, polyamides, nylon, poly(carboxylic acids), polyamines, polyethers, polyacetals, polysulfones, poly(organicsulfides), poly(organicoxides), polyesters, polycarbonates, polyimides, polyurethanes, polyetheretherketone resins, styrene/maleic anhydride resins, and mixtures thereof.

6. The molding system for forming articles from thermoplastic materials and reinforcement materials of claim 1 wherein the thermoplastic materials can be a single polymer, or a mixture of two or more polymers, or, the thermoplastic materials can comprise a homopolymer, copolymer, random copolymer, alternating copolymer, block copolymer, graft copolymer, liquid crystal polymer, or a mixture of these polymers.

7. A molding process for forming articles from thermoplastic materials and reinforcement materials, comprising:
 a. heating and blending thermoplastic materials with reinforcement materials to form a molten thermoplastic composite material having a concentration of reinforcement material by weight;
 b. extruding the molten composite material to form a flow of composite material gravitating onto a lower portion of a first mold for forming the article, wherein the lower portion of the first mold is carried by a first movable structure;
 c. moving the first movable structure and lower portion of the first mold in space and time toward a first press coupled to an upper portion of the first mold and capable of receiving the first movable structure with the lower portion of the first mold while receiving the flow of composite material to deposit a predetermined quantity of molten composite material thereon conforming to mold cavities of the lower and an upper portion of the first mold;
 d. moving the first movable structure and lower portion of the first mold with its predetermined quantity of molten composite material under the first press to press the upper portion of the first mold against the predetermined quantity of molten composite materials on the lower portion of the first mold to form an article;
 e. extruding the molten composite material to form a flow of composite material gravitating onto a lower portion of a second mold for forming an article, wherein the lower portion of the second mold is carried by a second movable structure;
 f. moving the second movable structure and lower portion of the second mold in space and time toward a second press coupled to an upper portion of the second mold and capable of receiving the second movable structure with the lower portion of the second mold while receiving the flow of composite material to deposit a predetermined quantity of molten composite material thereon conforming to mold cavities of the lower and an upper portion of the second mold;
 g. moving the second movable structure and lower portion of the second mold with its predetermined quantity of molten composite material under the second press to press the upper portion of the second mold against the predetermined quantity of molten composite materials on the lower portion of the second mold to form an article;
 h. wherein the steps of extruding the molten composite materials to form a flow of composite material gravitating onto a lower portion of a first and second mold comprise feeding the molten composite material from two extruders through primary rigid piping running from each extruder and coupled to first rotating elbows under software control that are operable to move secondary rigid piping across the lower molds as the movable structures carrying the lower molds move in time and space; and
 i. wherein the secondary moving piping is connected to second rotating elbows under software control that are operable to move final nozzles that distribute the predetermined quantities of molten composite materials onto the lower molds.

8. The molding process for forming articles from thermoplastic materials and reinforcement materials of claim 7 wherein the first and second movable structures are software-controlled motorized trolleys with wheels riding on rails along an axis between the first and second presses and the moving of the first and second movable structures along with the first and second lower portions of the first and second molds is performed by moving those motorized trolleys along the rails.

9. The molding process for forming articles from thermoplastic materials and reinforcement materials of claim 7 wherein the reinforcement materials are fibrous materials.

10. The molding process for forming articles from thermoplastic materials and reinforcement materials of claim 7 wherein the fibrous materials can be glass fibers, fiberglass, carbon fibers, synthetic fibers, metal fibers, natural fibers, cellulose, or wood.

11. The molding process for forming articles from thermoplastic materials and reinforcement materials of claim 7 wherein the thermoplastic materials can be polyolefins, polyhaloolefins, polyaromatics, poly(alkenylaromatics), polystyrene, acrylonitrile/butadiene/styrene resins, polyamides, nylon, poly(carboxylic acids), polyamines, polyethers, polyacetals, polysulfones, poly(organicsulfides), poly(organicoxides), polyesters, polycarbonates, polyimides, polyurethanes, polyetheretherketone resins, styrene/maleic anhydride resins, and mixtures thereof.

12. The molding process for forming articles from thermoplastic materials and reinforcement materials of claim 7 wherein the thermoplastic materials can be a single polymer, or a mixture of two or more polymers, or, the thermoplastic materials can comprise a homopolymer, copolymer, random copolymer, alternating copolymer, block copolymer, graft copolymer, liquid crystal polymer, or a mixture of these polymers.

13. A molding system for forming articles from thermoplastic materials and reinforcement materials, said molding system comprising:
   a. one or more extruders operable to blend and melt the thermoplastic material with the reinforcement material to form a flow of molten composite material for gravitating onto the lower portion of a mold;
   b. a movable structure carrying a lower portion of the mold and operable to be moved in space and time while that lower portion of the mold receives a flow of molten composite materials to deposit a predetermined quantity of molten composite materials thereon conforming to mold cavities of the lower and an upper portion of the mold;
   c. a press coupled to an upper portion of the mold and capable of receiving the movable structure with the lower portion of the mold, said press operable to press the upper portion of the mold against the predetermined quantity of molten composite materials on the lower portion of the mold to form the articles;
   d. primary rigid piping running from each extruder and coupled to first rotating elbows under software control that are operable to move secondary rigid piping across the lower mold as the movable structure carrying the lower mold moves in time and space; and
   e. second rotating elbows between the secondary rigid piping and feed nozzles under software control that gravitationally deliver precise amounts of molten composite materials directly into the lower mold.

14. A molding process for forming articles from thermoplastic materials and reinforcement materials, comprising:
   a. heating and blending thermoplastic materials with reinforcement materials to form a molten thermoplastic composite material having a concentration of reinforcement material by weight;
   b. extruding the molten composite material to form a flow of composite material gravitating onto a lower portion of a mold for forming the articles, wherein the lower portion of the mold is carried by a movable structure;
   c. moving the movable structure and lower portion of the mold in space and time toward a press coupled to an upper portion of the mold and capable of receiving the movable structure with the lower portion of the mold while receiving the flow of composite material to deposit a predetermined quantity of molten composite material thereon conforming to mold cavities of the lower and an upper portion of the mold;
   d. moving the movable structure and lower portion of the mold with its predetermined quantity of molten composite material under the press to press the upper portion of the mold against the predetermined quantity of molten composite materials on the lower portion of the mold to form the articles;
   e. wherein the steps of extruding the molten composite materials to form a flow of composite material gravitating onto a lower portion of the mold comprise feeding the molten composite material from one or two extruders through primary rigid piping running from each extruder and coupled to first rotating elbows under software control that are operable to move secondary rigid piping across the lower mold as the movable structure carrying the lower mold moves in time and space; and
   f. wherein the secondary moving piping is connected to second rotating elbows under software control that are operable to move final nozzles that distribute the predetermined quantities of molten composite materials onto the lower mold.

* * * * *